United States Patent
Tallam et al.

(10) Patent No.: US 7,738,267 B1
(45) Date of Patent: Jun. 15, 2010

(54) SYSTEMS AND METHODS FOR COMMON-MODE VOLTAGE REDUCTION IN AC DRIVES

(75) Inventors: Rangarajan Tallam, Germantown, WI (US); Russel Kerkman, Milwaukee, WI (US); David Leggate, New Berlin, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 12/394,613

(22) Filed: Feb. 27, 2009

Related U.S. Application Data

(60) Provisional application No. 61/143,028, filed on Jan. 7, 2009.

(51) Int. Cl.
H02J 3/36 (2006.01)
(52) U.S. Cl. .................................... 363/35
(58) Field of Classification Search ............. 363/34, 363/35, 123
See application file for complete search history.

(56) References Cited

U.S. PATENT DOCUMENTS

| | | |
|---|---|---|
| 6,359,416 B1 | 3/2002 | Rao et al. |
| 6,469,916 B1 | 10/2002 | Kerkman et al. |
| 6,477,067 B1 | 11/2002 | Kerkman et al. |
| 6,541,933 B1 | 4/2003 | Leggate et al. |
| 6,617,821 B2 | 9/2003 | Kerkman et al. |
| 6,636,012 B2 | 10/2003 | Royak et al. |
| 6,703,809 B2 | 3/2004 | Royak et al. |
| 6,720,748 B1 | 4/2004 | Seibel et al. |
| 6,819,070 B2 | 11/2004 | Kerkman et al. |
| 6,819,077 B1 | 11/2004 | Seibel et al. |
| 6,842,354 B1 | 1/2005 | Tallam et al. |
| 6,982,533 B2 | 1/2006 | Seibel et al. |
| 7,034,501 B1 | 4/2006 | Thunes et al. |
| 7,106,025 B1 | 9/2006 | Yin et al. |
| 7,164,254 B2 | 1/2007 | Kerkman et al. |
| 7,215,559 B2 | 5/2007 | Nondahl et al. |
| 7,336,509 B2 | 2/2008 | Tallam |
| 7,342,380 B1 | 3/2008 | Kerkman et al. |
| 7,356,441 B2 | 4/2008 | Kerkman et al. |
| 7,400,518 B2 | 7/2008 | Yin et al. |
| 7,471,525 B2* | 12/2008 | Suzuki et al. .............. 363/37 |

OTHER PUBLICATIONS

Taiwan Patent Publication TW439350, Jun. 7, 2001.
Emre Un and Ahmet M. Hava, "A Near State PWM Method With Reduced Switching Frequency and Reduced Common Mode Voltage For Three-Phase Voltage Source Inverters", 2007 IEEE.
A.M.De Broe, A.L. Julian, and T.A. Lipo, "Neutral-To-Ground Voltage Minimization in a PWm-Rectifier/Inverter Configuration", Power Electronics and Variable Speed Drives, Sep. 23-25, 1996, Conference Publication No. 429, IEEE, 1996.

(Continued)

*Primary Examiner*—Shawn Riley
(74) *Attorney, Agent, or Firm*—Fay Sharpe LLP; Alexander R. Kuszewski; John M. Miller

(57) ABSTRACT

Control systems, methods and power conversion systems are presented for controlling common mode voltages in AC motor loads driven by inverter PWM control using switching sequences with only active vectors where a first vector of each switching sequence differs by one phase switching state from a last vector of a switching sequence of an adjacent sector, along with enhanced deadtime compensation and reflected wave reduction techniques in providing pulse width modulated switching signals to a switching inverter.

20 Claims, 14 Drawing Sheets

OTHER PUBLICATIONS

Jay M. Erdman, Russel J. Kerkman, David W. Schlegel, and Gary L. Skibinski, "Effect of PWM Inverters on AC Motor Bearing Currents and Shaft Voltages", 1996 IEEE.

A. Muetze & A. Binder, "Don't Lose Your Bearings", Mitigation techniques for bearing currents in inverter-supplied drive systems, 2006 IEEE.

Yeb-Shin Lai and Fu-San Shyu, "Optimal Common-Mode Voltage Reduction PWM Technique for Inverter Control with Consideration of the Dead-Time Effects- Part I: Basic Development", 2004 IEEE.

Qiang Yin, Russel J. Kerkman, Thomas A. Nondahl, and Haihui Lu, "Analytical Investigation of the Switching Frequency Harmonic characteristic for Common Mode Reduction Modulator", 2005 IEEE.

Russel J. Kerkman, David Leggate, Dave Schlegel, and Gary Skibinski, "PWM Inverters and Their Influence on Motor Over-Voltage", 1997 IEEE.

Emre Un and Ahmet M. Hava, "A High Performance PWM Algorithm for Common Mode Voltage Reduction in Three-Phase Voltage Source Inverters", 2008 IEEE.

* cited by examiner

SYSTEMS AND METHODS FOR COMMON-MODE VOLTAGE REDUCTION IN AC DRIVES

REFERENCE TO RELATED APPLICATION

This application claims priority to and the benefit of U.S. Provisional Patent Application Ser. No. 61/143,028, which was filed Jan. 7, 2009, entitled COMMON-MODE VOLTAGE REDUCTION PWM ALGORITHM FOR AC DRIVES, the entirety of which is hereby incorporated by reference.

FIELD OF THE INVENTION

The present disclosure relates generally to electrical power conversion and more particularly to reducing common mode voltages in AC motor drives.

BACKGROUND OF THE INVENTION

Power conversion systems convert electrical power from one form to another and may be employed in a variety of applications such as motor drives for powering an electric motor using power from an input source. Such power converters are typically constructed using electrical switches actuated in a controlled fashion to selectively convert input power to output power of a desired form such as single or multi-phase AC of a controlled amplitude, frequency and phase to drive an AC motor according to a desired speed and/or torque profile, often in the presence of varying load conditions. AC motor drives generally provide a controlled AC output via an inverter that converts DC to AC using an array of high-voltage, high-speed semiconductor-based switching devices. The inverter switches are actuated through various forms of pulse width modulation (PWM), with the timing of the array switching determining the power conversion performance to convert power from a DC bus to variable frequency, variable amplitude single or multi-phase AC output power. The PWM switching states used in the inverter are often modeled in terms of a space vector diagram that includes zero vectors at a diagram origin and non-zero (active) vectors, where such control is sometimes referred to as space vector modulation (SVM) or space vector pulse width modulation (SVPWM). U.S. Pat. No. 7,164,254 to Kerkman et al., issued Jan. 16, 2007 and assigned to the assignee of the present application discloses common mode voltage reduction techniques in which the switching sequence is modified to avoid using the zero vectors so as to reduce common mode voltages in the motor. The entirety of this patent is hereby incorporated by reference as if fully set forth herein. U.S. Pat. No. 7,106,025 to Yin et al., issued Sep. 12, 2006 and assigned to the assignee of the present application discloses techniques for canceling dead time effects in the algorithm to reduce common mode voltages produced by a three-phase power conversion device in a rectifier/inverter variable frequency drive (VFD), the entirety of which is hereby incorporated by reference as if fully set forth herein. U.S. Pat. No. 6,819,070 to Kerkman et al., issued Nov. 16, 2004 and assigned to the assignee of the present application discloses inverter switching control techniques to control reflected voltages in AC motor drives, the entirety of which is hereby incorporated by reference as if fully set forth herein. U.S. Pat. No. 7,034,501 to Thunes et al., issued Apr. 25, 2007 and assigned to the assignee of the present application discloses gate pulse time interval adjustment techniques for mitigating reflected waves in AC motor drives, the entirety of which is hereby incorporated by reference as if fully set forth herein.

SUMMARY OF INVENTION

Various aspects of the present disclosure are now summarized to provide a basic understanding of the disclosure, where the following is not an extensive overview of the disclosure, and is intended neither to identify certain elements of the disclosure, nor to delineate the scope thereof. This summary presents certain concepts of the disclosure in a simplified form prior to the more detailed description that is presented hereinafter. The present disclosure is directed to pulse width modulation techniques for controlling an active power converter, and finds particular utility in association with switching inverters used to drive AC motor loads. The novel aspects described herein may be advantageously employed to reduce common mode voltage effects caused by deadtime, reflected wave, and zero vector issues by select employment of active vector-only switching sequences in pulse width modulation, reflected wave mitigation techniques, and/or deadtime compensation in motor drives and other power converters providing AC outputs.

In accordance with one or more aspects of the present disclosure, a power conversion system and switching control system therefor are provided. The converter includes an inverter with a switching network comprised of a plurality of switching devices coupled between a DC circuit and AC output terminals and operable according to switching control signals, and a switch control system that provides the switching control signals by pulse width modulation based at least partially on feedback signals or values from the AC output and according to a reference vector position in a space vector modulation diagram. The switch control system provides the switching signals according to a sequence corresponding to the diagram sector in which the reference vector is currently located with each switching sequence using only active vectors, with the first vector of each sequence differing by a single phase switching state from a last vector of the adjacent sector to mitigate adverse common mode voltages at the converter output. In accordance with certain aspects of the disclosure, this common mode reduction pulse width modulation (CMRPWM) approach is employed in a carrier-based PWM inverter controller, which uses a carrier wave generator, one or more comparators operative to compare the carrier wave with the feedback signals or values, and a set of switching sequences to provide the switching control signals by pulse width modulation based on the comparator outputs.

In further aspects of the disclosure, the switch control system selectively provides certain switching control signals using active high pulse width modulation and other switching control signals using active low pulse width modulation. A deadtime compensation component is provided in the control system and operates to selectively adjust one or more feedback signals or values for deadtime compensation at switching state transitions within a pulse width modulation period $T_{PWM}$. The deadtime compensation selectively increases or decreases feedback signals or values associated with phases depending on the polarity of the phase current and whether the phase employs active high pulse width modulation or active low pulse width modulation in order to combat phase distortion associated with deadtime issues in the switching inverter. In further aspects of the disclosure, the deadtime compensation component selectively adjusts the feedback signals or values $\phi$ as $\phi'=\phi+\text{sign}(i_\phi)\cdot(T_d/T_{PWM})$ for active high pulse width modulation and as $\phi'=\phi-\text{sign}(i_\phi)\cdot(T_d/T_{PWM})$ for active low modulation, where $i_\phi$ is the corresponding phase current, $T_d$ is a predetermined deadtime value, and $T_{PWM}$ is the PWM period. In other related aspects, at sector transitions, the volt-second error occurring due to the first vector of each sequence being different from the last vector of the previous sector is accumulated for adjustments to the phase signals or values in a subsequent pulse width modulation period.

In accordance with still other aspects of the disclosure, the switch control system includes a reflected wave reduction component which determines max, mid, and min ones of the feedback signals or values φ and selectively adjusts one or more of the feedback signals or values higher or lower for reflected wave compensation. The reflected wave reduction component adjusts at least one of the feedback signals or values φ at each pulse width modulation period to provide minimum differences between the signals or values φ according to the equations (max−mid)>2($T_{dwell}/T_{PWM}$) and (mid−min)>2($T_{dwell}/T_{PWM}$), where $T_{dwell}$ is a predetermined dwell time. In other aspects of the disclosure, the reflected wave reduction component accumulates reflected wave adjustment amounts for each phase signal or value φ and to adjust one or more feedback signals or values φ higher or lower in a subsequent pulse width modulation period to compensate for the volt-second adjustments in a previous pulse width modulation period.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF THE INVENTION

Figure 1A:
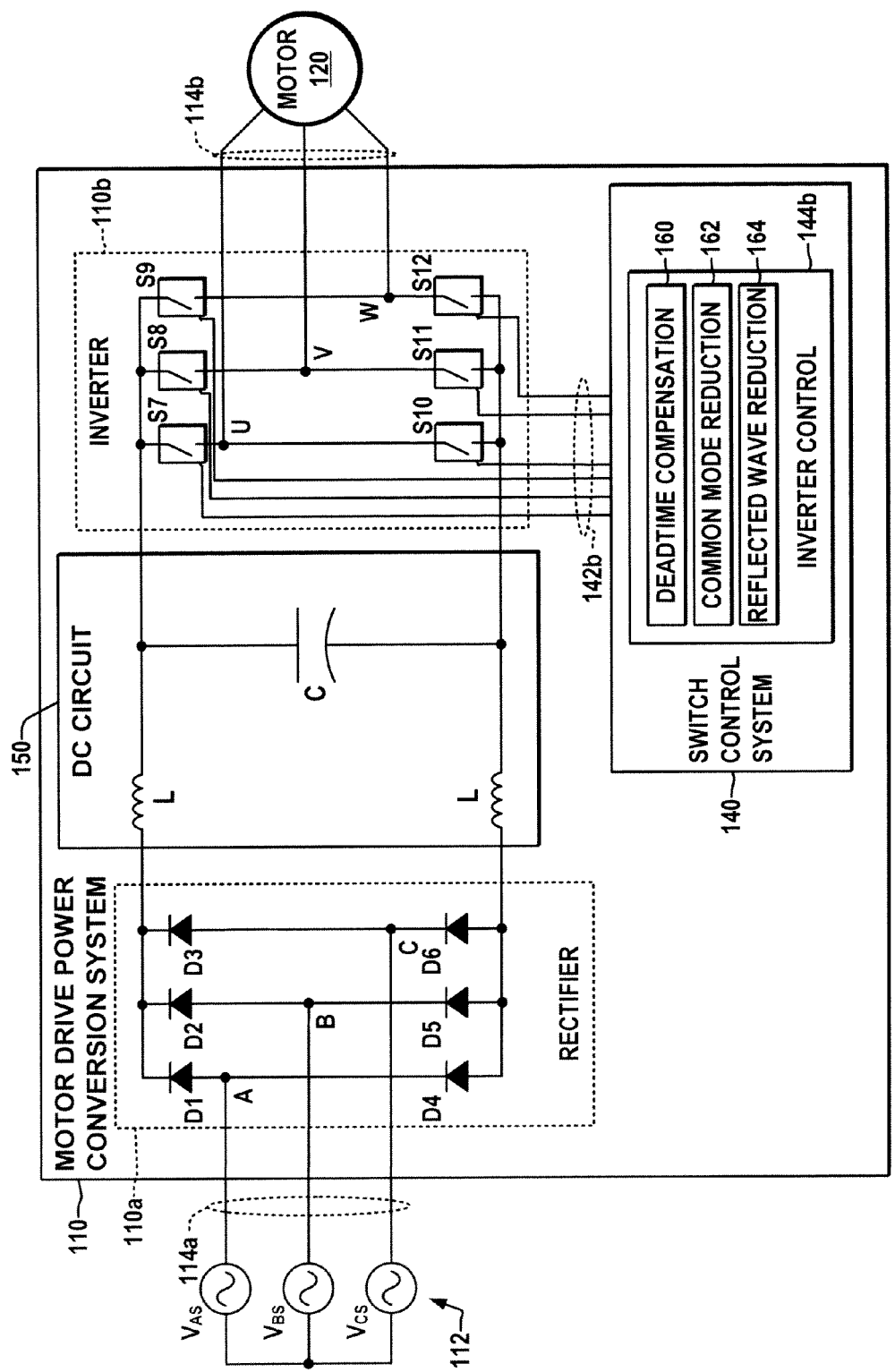
FIG. 1A is a schematic diagram illustrating an exemplary voltage source converter type motor drive power conversion system with a passive input rectifier and a switching inverter controlled according to various aspects of the disclosure to drive a three-phase AC motor by converting power from a DC circuit.

Referring now to the figures, several embodiments or implementations of the present disclosure are hereinafter described in conjunction with the drawings, wherein like reference numerals are used to refer to like elements throughout, and wherein the various features are not necessarily drawn to scale. The disclosure provides pulse width modulation methods and control systems for operating switching power converters as well as power conversion systems, in which common mode voltage problems are mitigated by use of switching sequences that avoid zero vectors and by selective reflected wave reduction and deadtime compensation in the generation of pulse width modulation signals. The various aspects of the disclosure are hereinafter illustrated and described in the context of motor drives with internal active or passive rectifiers and inverters for driving multiphase AC motors, the various aspects of the disclosure may be employed in power conversion systems generally, including those providing single or multiphase AC outputs, those deriving DC input power from any suitable source, and those that drive motors or other AC loads, wherein all such alternate implementations and applications are deemed to fall within the scope of the present disclosure and the appended claims.

Figure 1B:
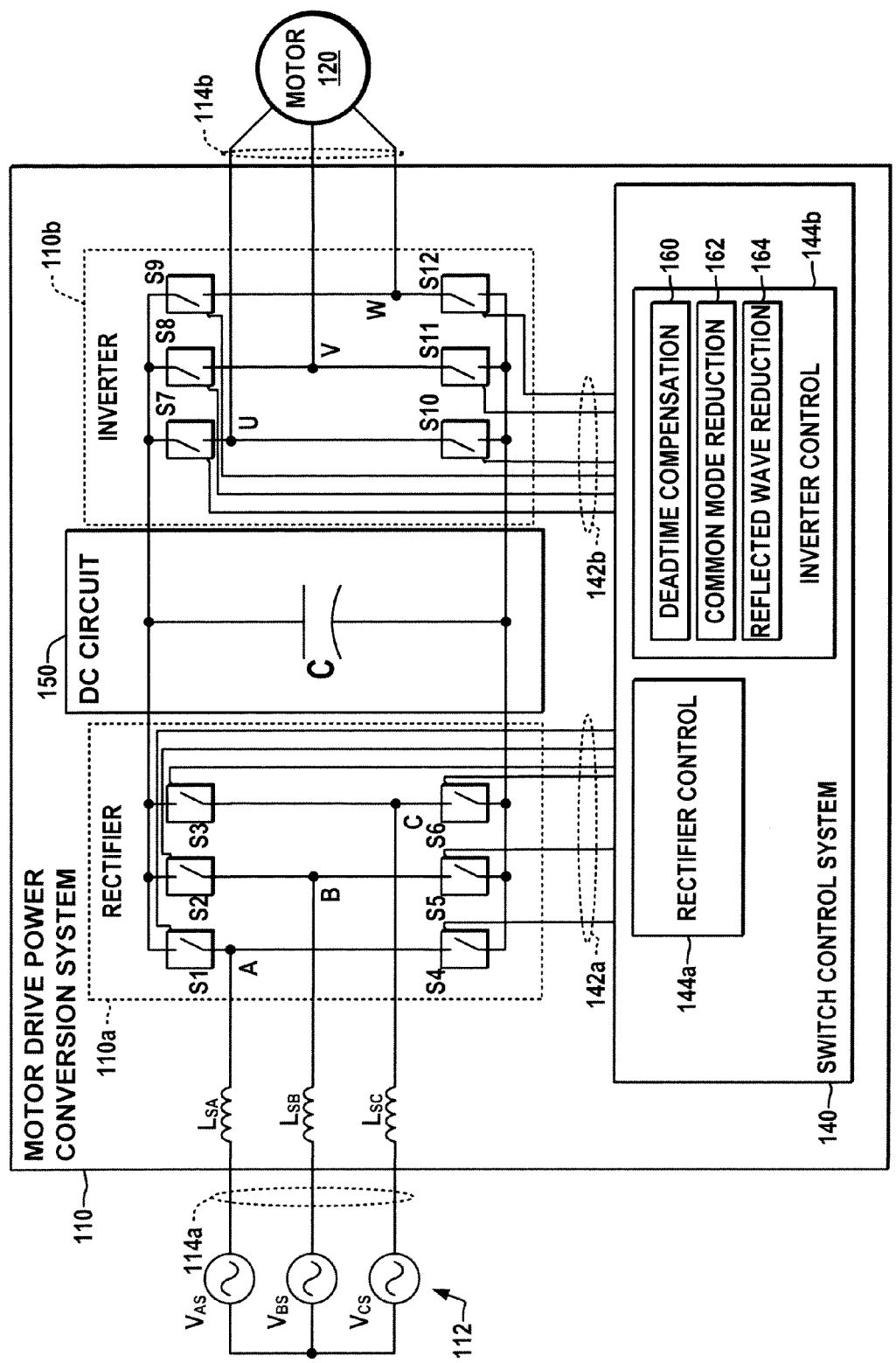
FIG. 1B is a schematic diagram illustrating another exemplary motor drive power conversion system with an active rectifier and a switching inverter controlled according to various aspects of the disclosure to drive an AC motor.

Referring initially to FIGS. 1A and 1B, various concepts of the present disclosure are illustrated and described hereinafter in the context of an exemplary switching type AC-DC-AC motor drive conversion system 110 configured to drive a multiphase AC motor 120, such as an induction motor, although the disclosure is not limited to the illustrated embodiments. The exemplary power converter 110 is a voltage source converter type system, although variant embodiments are contemplated as falling within the scope of the present disclosure and the claims. FIGS. 1A and 1B illustrate an exemplary power system including a multiphase AC power source 112 providing multiphase AC electric power to the conversion system or drive 110. The system 110 includes a line side rectifier 110a and a machine (load) side switching inverter 110b, where the rectifier 110a may be a passive type with diode rectifiers D1-D6 as shown in the embodiment of FIG. 1A, or may be a switching rectifier with switching devices S1-S6 as shown in the embodiment of FIG. 1B. The inverter 110b and optionally the switching rectifier 110a (FIG. 1B) are operated by a switch control system 140 for motor drive operation where the rectifier 110a and inverter 110b are coupled by a DC circuit 150 to selectively provide three-phase electric power to the motor load 120. In the illustrated example, the three-phase AC power source 112 provides electrical power to the motor drive 110 via a three-phase input 114a for conversion to supply a DC bus in the DC circuit 150, with the inverter generating AC output signals using power from the DC circuit 150. The present disclosure may be advantageously employed in association with single-phase and/or multiphase input or output implementations, and the source 112 and load 120 may be operated at any suitable frequency and amplitudes with the motor drive 110 being adapted to receive and convert the input AC power at the supply frequency.

In the embodiment of FIG. 1A the passive rectifier 110a operates to rectify the input AC to provide DC power for subsequent inversion using the diodes D1-D6, where the exemplary DC circuit 150 includes smoothing inductors L and a capacitor C bridging forward and return DC circuit paths. In the active rectifier 110a of FIG. 1B, the AC input power is switched by a first set of switches S1-S6 constituting a line side converter 110a in the form of a switching regulator circuit or stage to create an intermediate DC bus current, where the exemplary DC circuit 150 includes a capacitor C to provide a stable DC bus for subsequent inversion to drive the motor 120. On the machine side, the exemplary inverter 110b includes an array of switching devices S7-S12 that are operated according to corresponding switching control signals 142b to selectively switch the DC power to provide AC power to an AC output 114b for driving the motor 120, with the intermediate DC circuit 150 providing forward and reverse current paths between the rectifier 110a and the inverter 110b. A forward or positive DC path in the circuit 150 is connected to the upper rectifier diodes D1-D3 (FIG. 1A) or rectifier switches S1-S3 (FIG. 1B) and to the upper output switches S7-S9 of the inverter 110b, and a negative or return DC path is coupled to the lower rectifier diodes D4-D6 (FIG. 1A) or switches S4-S6 (FIG. 1B) and to the lower output switches S10-S12 of the inverter 110b. The exemplary motor drive 110 in FIG. 1B, moreover, includes line reactors $L_{SA}$, $L_{SB}$, and $L_{SC}$ connected in series between the input phase sources $V_{AS}$, $V_{BS}$, and $V_{CS}$ (112) and corresponding switch circuit input nodes A, B, and C (114a), respectively, of the rectifier 110a, and the inverter 110b is shown generating three-phase AC output voltages and currents at the output phases U, V, and W (114b), wherein other implementations may include various optional input and/or output filter capacitors (not shown).

Figure 1C:
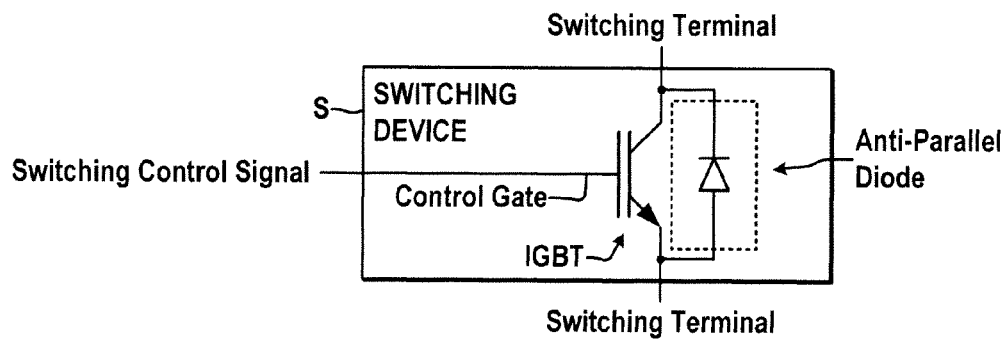
FIG. 1C is a schematic diagram illustrating an exemplary IGBT type switching device with anti-parallel diode used to selectively convert DC power into AC output power in the inverter of FIGS. 1A and 1B in accordance with the present disclosure.

Referring also to FIG. 1C, the switching devices S1-S6 (FIG. 1A) and S7-S12 (FIGS. 1A and 1B) may be any suitable controllable electrical switch types (e.g., thyristors, IGBTs, etc.) that are controlled according to any suitable type or form of switching signals 142a, 142b from a switch control system 140. In the illustrated embodiments, IGBT switching devices S are used, as exemplified in FIG. 1C. This implementation includes anti-parallel diodes connected in parallel across the switching terminals, with a base or control gate terminal being coupled with the switch control system 140 to receive a corresponding switching control signal for selectively electrically connecting or decoupling the two switching terminals.

Figure 1D:
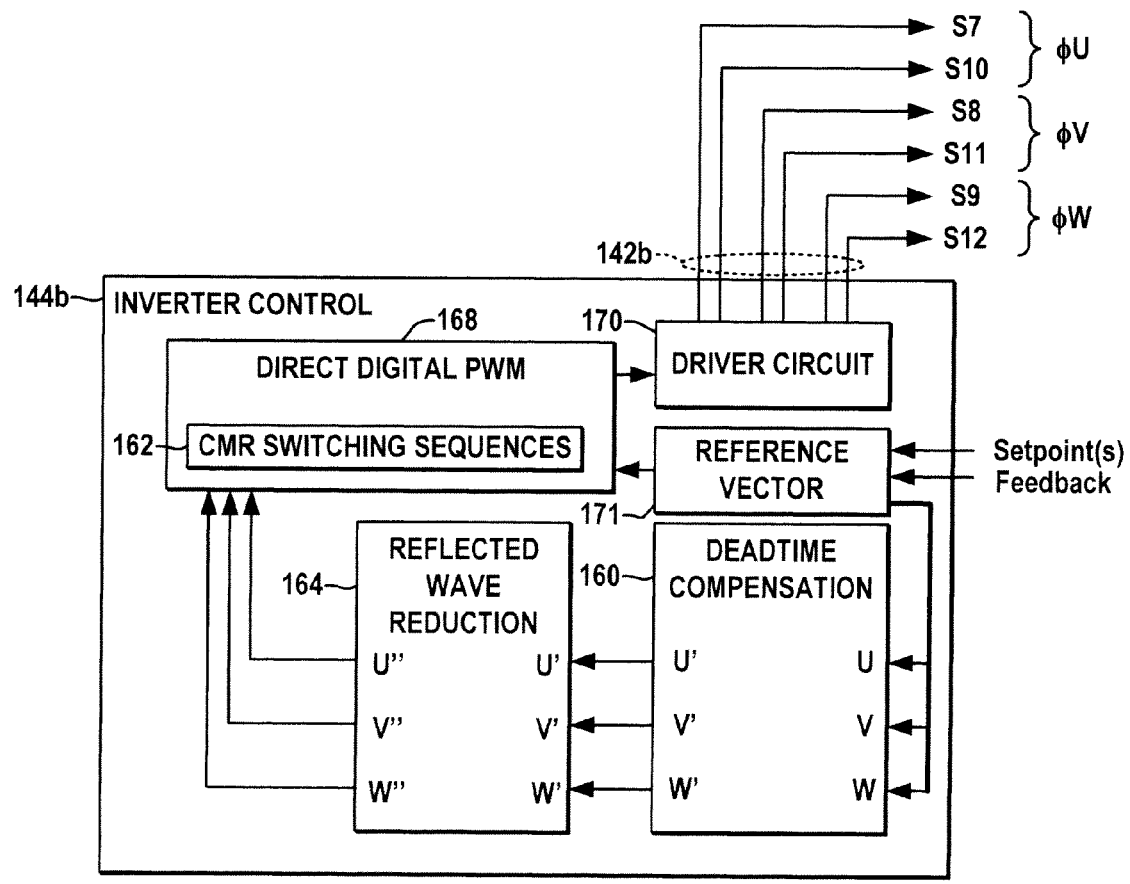
FIG. 1D is a schematic diagram illustrating one exemplary inverter switch control system implementing direct digital pulse width modulation using common mode reduction space vector modulation switching sequences, reflected wave reduction and deadtime compensation components in accordance with various aspects of the present disclosure.
Figure 1E:
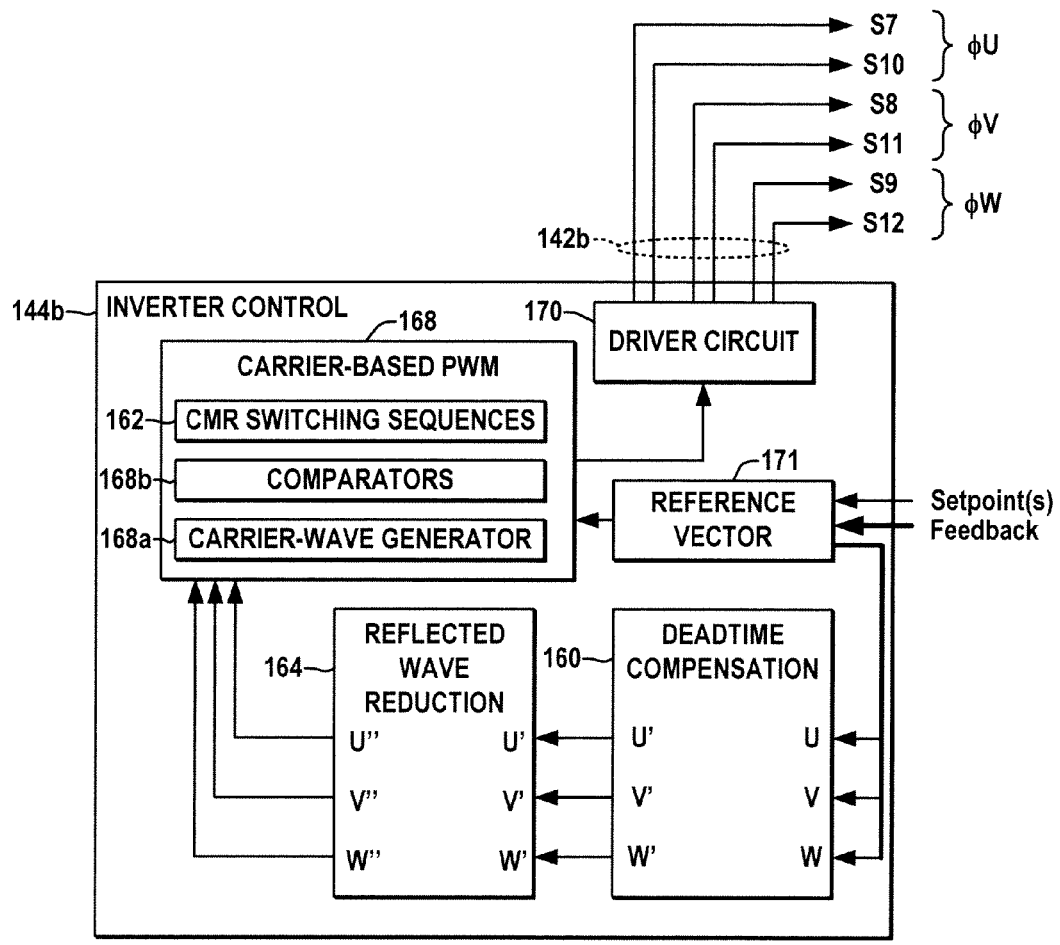
FIG. 1E is a schematic diagram illustrating another exemplary inverter switch control system implementing carrier-based, sine-triangle pulse width modulation with a carrier-wave generator and comparators using common mode reduction space vector modulation switching sequences, reflected wave reduction and deadtime compensation components in accordance with the present disclosure.

Referring also to FIGS. 1D and 1E, the switching control signals 142b are provided to the inverter 110b from an inverter portion 144b of the switch control system 140, which may employ any suitable form of pulse width modulation circuitry to implement direct digital PWM (FIG. 1D) or carrier-based PWM (FIG. 1E). With respect to the switching inverter 110b, the embodiment of FIG. 1D provides an inverter switch control system 144b including a direct digital pulse width modulation component 168 using common mode reduction switching sequences 162. The direct digital PWM component 168 provides pulse width modulated switching control signals 142b to the inverter 110b via a driver circuit 170 based on a reference vector 171 derived from one or more setpoints (e.g., speed, torque, angle, etc.) and on feedback signals or values representing the output of the inverter 110b (e.g., phase voltages, currents, motor speed and/or position feedback, etc.). FIG. 1E illustrates another exemplary inverter control 144b with a carrier-based (e.g., sine-triangle) pulse width modulation component 168 with a carrier-wave generator 168a and comparators 168b using common mode reduction space vector modulation switching sequences 162.

The exemplary inverter control components 144b of FIGS. 1D and 1E also include reflected wave reduction and deadtime compensation components 164 and 160, respectively, described in greater detail below in accordance with various aspects of the present disclosure. In practice, the control component 144b of the switch control system 140 receives feedback signals or values φ, which may be of any form, representing the AC phase outputs (phases u, v, and w in the illustrated examples). In operation of the illustrated embodiments, an optional deadtime compensation component 160 selectively adjusts one or more of the feedback signals or values φ higher or lower for deadtime compensation at switching state transitions within a pulse width modulation period $T_{PWM}$ based on use of active high or active low pulse width modulation and the polarity of the phase current for the corresponding output phase φ to generate deadtime compensated feedback signals or values φ' (e.g., u', v', and w' in the described examples). In certain implementations, moreover, the deadtime compensated signals u', v', and w' are then selectively adjusted by an optional reflected wave reduction component 164 to generated feedback signals or values u", v", and w" (collectively φ") used by the PWM component 168. The switch control system 140 generates pulse width modulated inverter switching control signals 142b and optionally rectifier control signals 142a in the embodiment of FIG. 1B) and the signals 142b are provided to the individual switches S7-S12 from the inverter control component 144b of the switch control system 140 in order to implement a given power conversion task. The switch control system 140 may be provided with one or more setpoint desired values and one or more feedback signals or values by which the output power is controlled. The setpoint inputs and the feedback signals or values φ may be in any suitable form such as an electrical signal, digital data values, etc., and may be received from any suitable source, such as sensors, external networks, switches, a user interface provided on the drive 110, or other suitable source(s).

The switch control system 140 and the components 144, 160, 162, 164 thereof can be implemented as any suitable hardware, software, programmable logic, or combinations thereof, operative as any suitable controller or regulator by which the motor 120 is controlled according to one or more desired profile(s) or setpoint(s) in open or closed-loop fashion. In this regard, the exemplary controller can be operated in a number of different modes or control schemes, including controlling torque, speed, position, etc., although the particular motor control scheme or application is not a strict requirement of the present disclosure. The switch control system 140 is adapted to provide appropriate switching signals 142 to operate the motor 120 in accordance with a given control strategy, wherein the switch controls 142 provide pulse width modulation (PWM) switch timing control. In operation with an active or passive rectifier 110*a,* three-phase AC power from the input power source 112 is rectified to provide DC power in the DC circuit 150. DC power from the intermediate DC circuit 150 is then converted to AC output power via the inverter 110*b* in which the switches S7-S12 receive inverter switching control signals 142*b* from the inverter component 144*b* of the controller 140 in order to provide AC power of appropriate amplitude, frequency, and phase to the motor 120 in a controlled fashion.

Figure 2A:
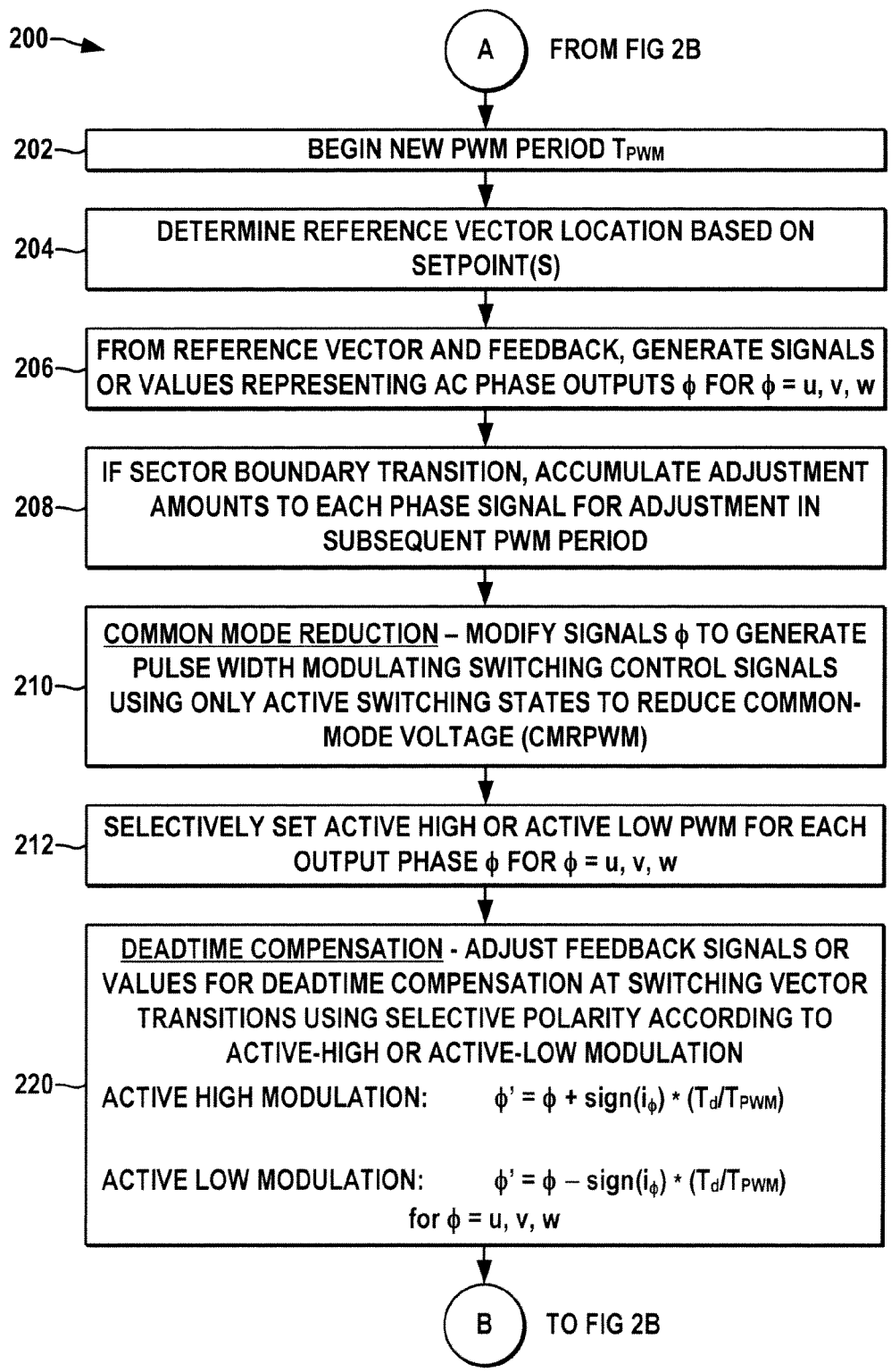
FIGS. 2A and 2B are a flow diagram illustrating an exemplary method for controlling a pulse width modulated power conversion system in accordance with other aspects of the present disclosure.
Figure 2B:
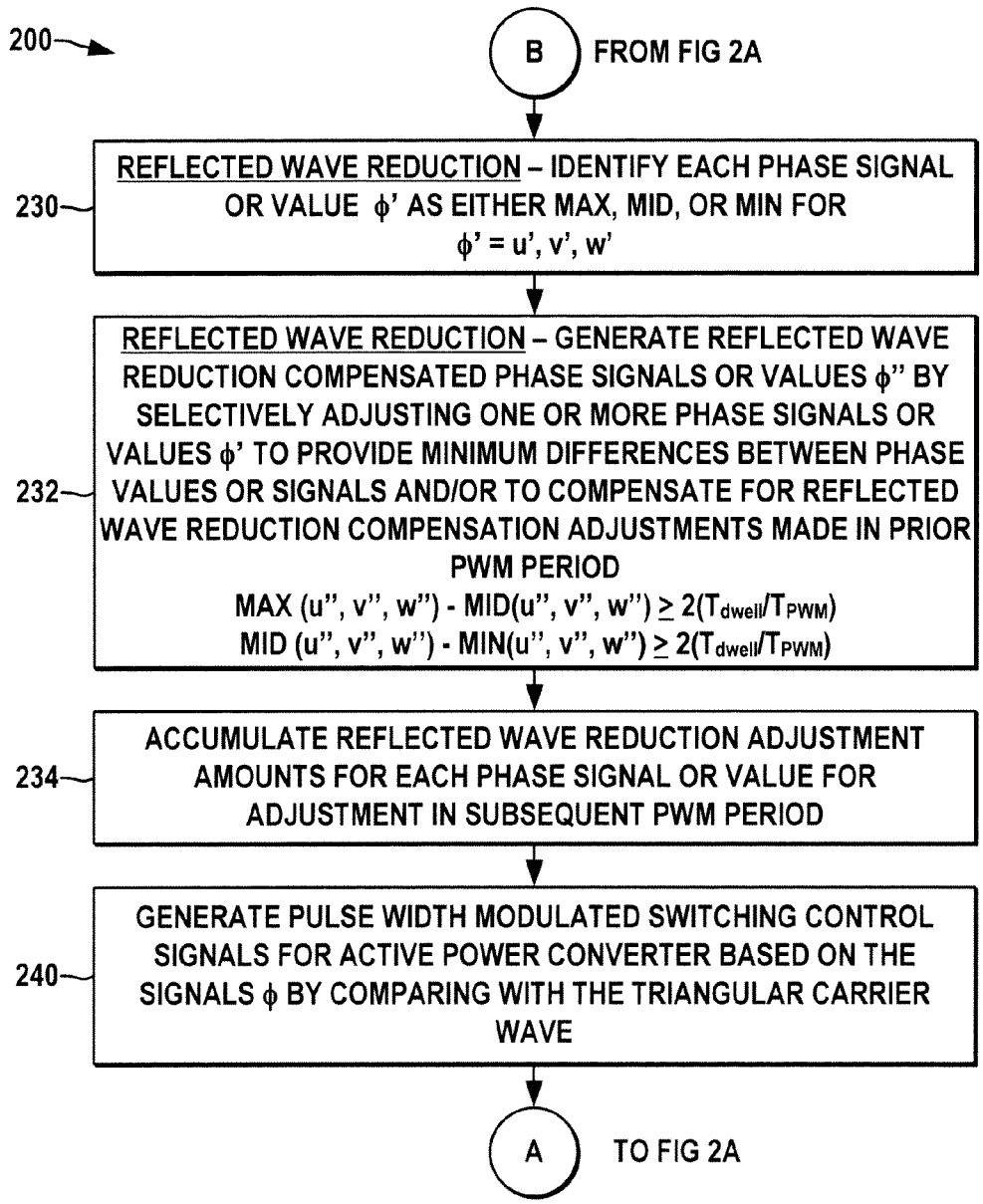
Figure 3A:
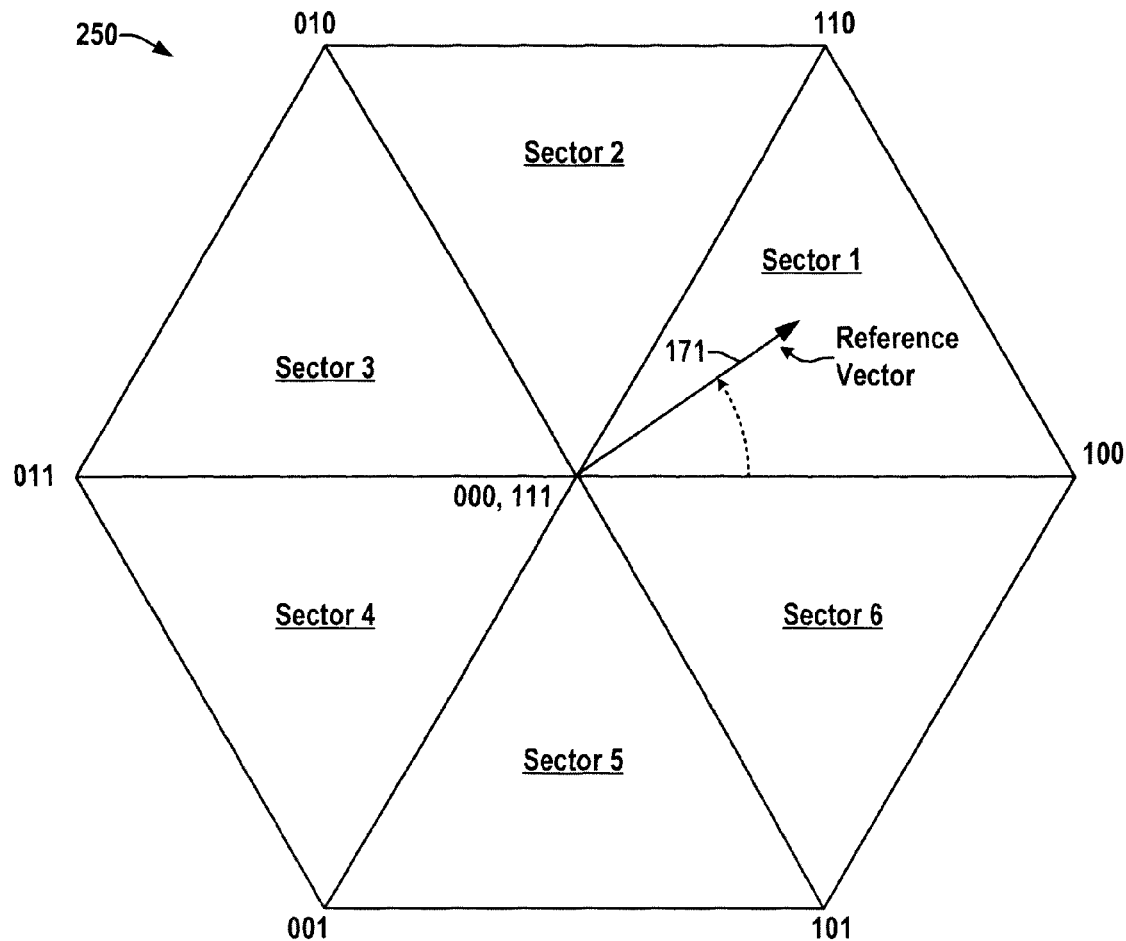
FIG. 3A is a schematic diagram illustrating an exemplary space vector modulation (SVM) diagram having six sectors and a rotating reference vector with peripheral corners defining active switching vectors used in the various common mode reduction pulse width modulation schemes of the present disclosure.

Referring also to FIGS. 2A-3C, a process 200 is illustrated in FIGS. 2A and 2B by which the switch control system 140 generates the pulse width modulated switching control signals 142*b* for the inverter 110*b* using space vector modulation according to a set of switching sequences 162*a*-162*f* (FIG. 3B) for each sector of a space vector modulation diagram 250 (FIG. 3A). Although the PWM power converter control method 200 is illustrated and described below in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the CMR pulse width modulation control functionality described herein, and may be employed in any power conversion system including but not limited to the above illustrated system 110, wherein the disclosure is not limited to the specific applications and embodiments illustrated and described herein.

Figure 3B:
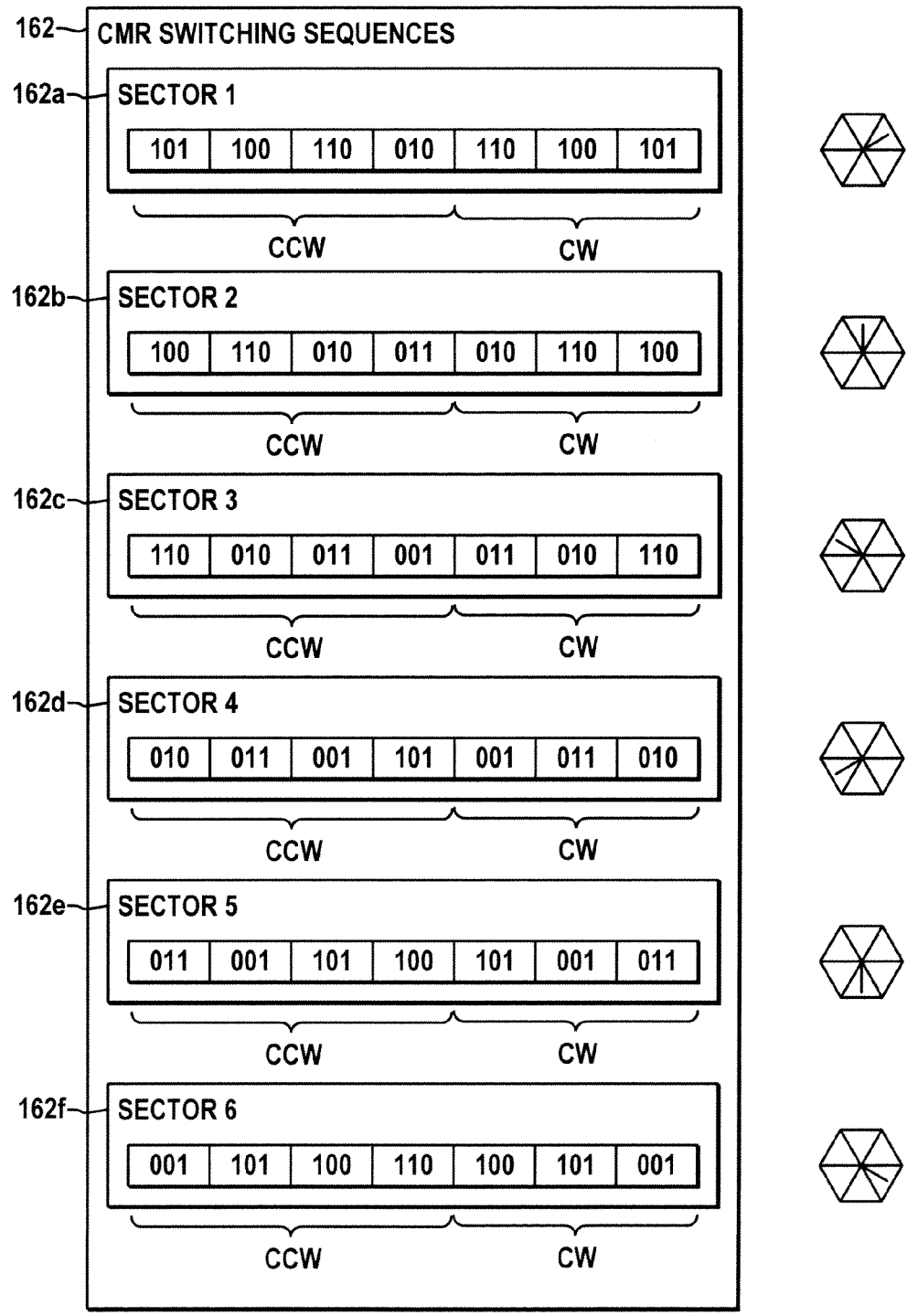
FIG. 3B is a schematic diagram illustrating an exemplary set of common mode reduction switching sequences for the six sectors in the diagram of FIG. 3A that can be used in the various common mode reduction pulse width modulation schemes of the present disclosure.

An exemplary space vector modulation diagram 250 shown in FIG. 3A includes six stationary active space vectors 100, 110, 010, 011, 001, and 101 positioned counterclockwise (CCW) around the periphery of the diagram as well as two stationary zero vectors 001 and 111 located at the diagram origin, where the active and zero vectors represent unique switching states for the inverter switching network S7-S12. The diagram 250 also defines six triangular sectors (labeled Sector 1 through Sector 6 in FIG. 3A) positioned around the origin, each of which is defined by a unique set of two of the active vectors and the zero vectors at the corners of the corresponding triangular segment. To operate the inverter, the switch control system 140 provides the switching control signals 142*b* according to a selected switching sequence 162 corresponding to the diagram sector in which the reference vector 171 is currently located. As shown in FIG. 3B, moreover, each switching sequence 162 uses only active vectors, and substitutes diametrically opposite active vectors for the deleted zero vectors. For instance, the switching sequence 162*a* for sector 1 uses the active vectors 100 and 110 that bound the sector, and also uses diametrically opposite active vectors 010 and 101 as a substitute for the zero vectors.

As a result, the switching sequence 162*a* uses only active vectors. Moreover, the sequence 162*a* begins and ends with the active vector 101, which differs by one phase switching state from the last vector of the switching sequences associated with its adjacent (neighboring) sectors 2 and 6. In this regard, the first vector 101 of sector 1 sequence 162*a* differs by one switching state from the last vector 001 in the sequence 162*f* of neighbor sector 6. Likewise, the first vector 101 in sequence 162*a* for sector 1 differs by only one switching state from the last vector 100 in the sequence 162*b* of the other adjacent sector 2. In operation, the avoidance of the zero vectors is effective to combat common mode voltages at the motor load 120, whereby the switching sequences 162 are referred to herein as common mode reduction (CMR) sequences, and the pulse width modulation using these is referred to as CMRPWM. In addition, the sequences 162 each begin in a counterclockwise (CCW) direction, and finish in a clockwise (CW) direction as indicated in the diagram of FIG. 3B. The sequential vectors selected by this PWM technique differ from one another by only one switching state. The same is true for the sequences 162*b*-162*f* corresponding to sectors 2-6 in FIG. 3B. Thus, the exemplary CMR switching sequences 162 employed by the switch control system 140 do not cause concurrent switching of two phase states in the inverter 110*b,* even at sector transitions, thereby further reducing common mode voltages at the motor 120.

Figure 3C:
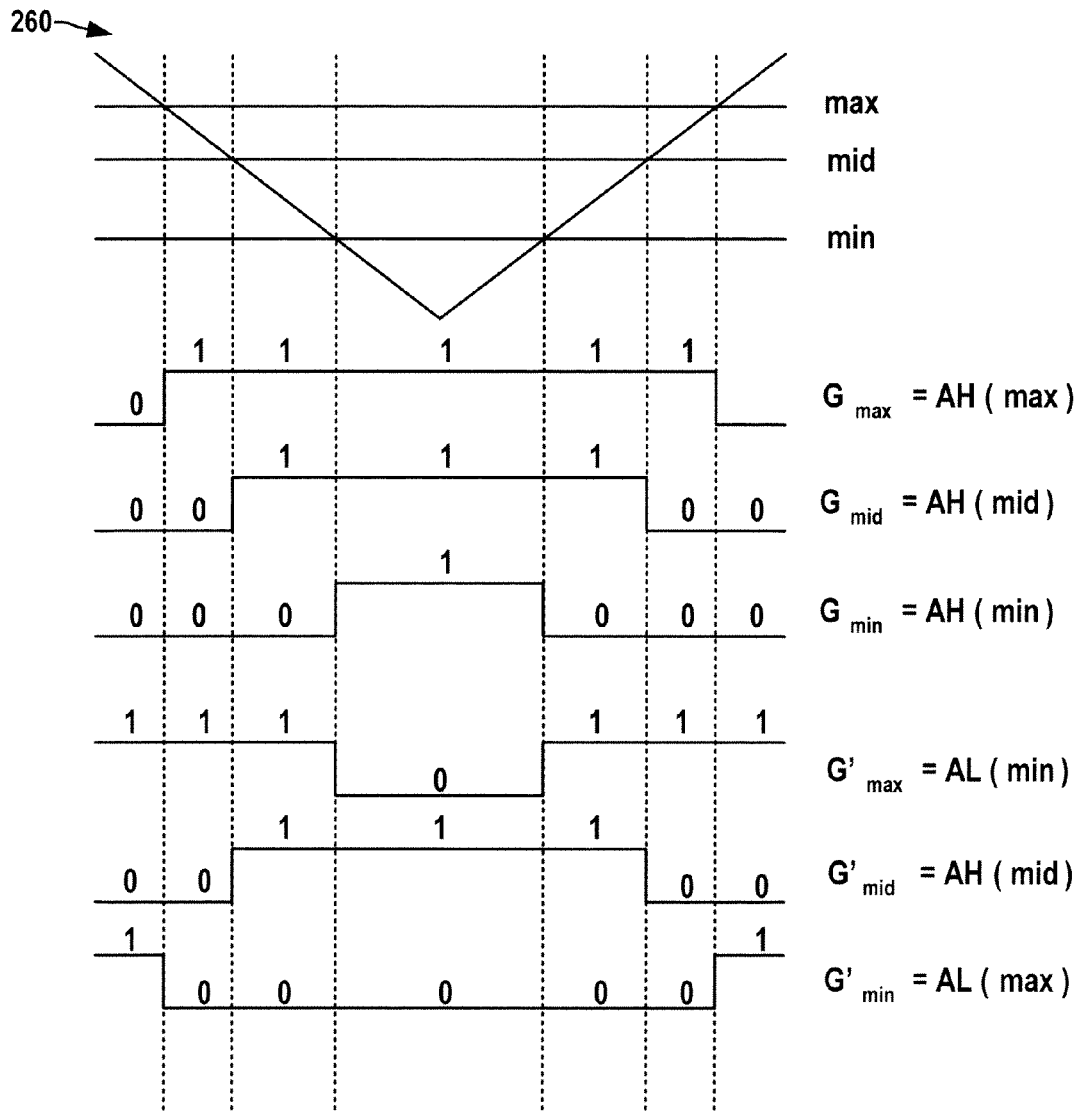
FIGS. 3C and 3D are timing diagrams illustrating exemplary phase feedback signals or values and a triangle carrier wave, with selective use of active high or active low pulse width modulation in the controller of FIGS. 1A and 1B in accordance with various aspects of the present disclosure.
Figure 3D:
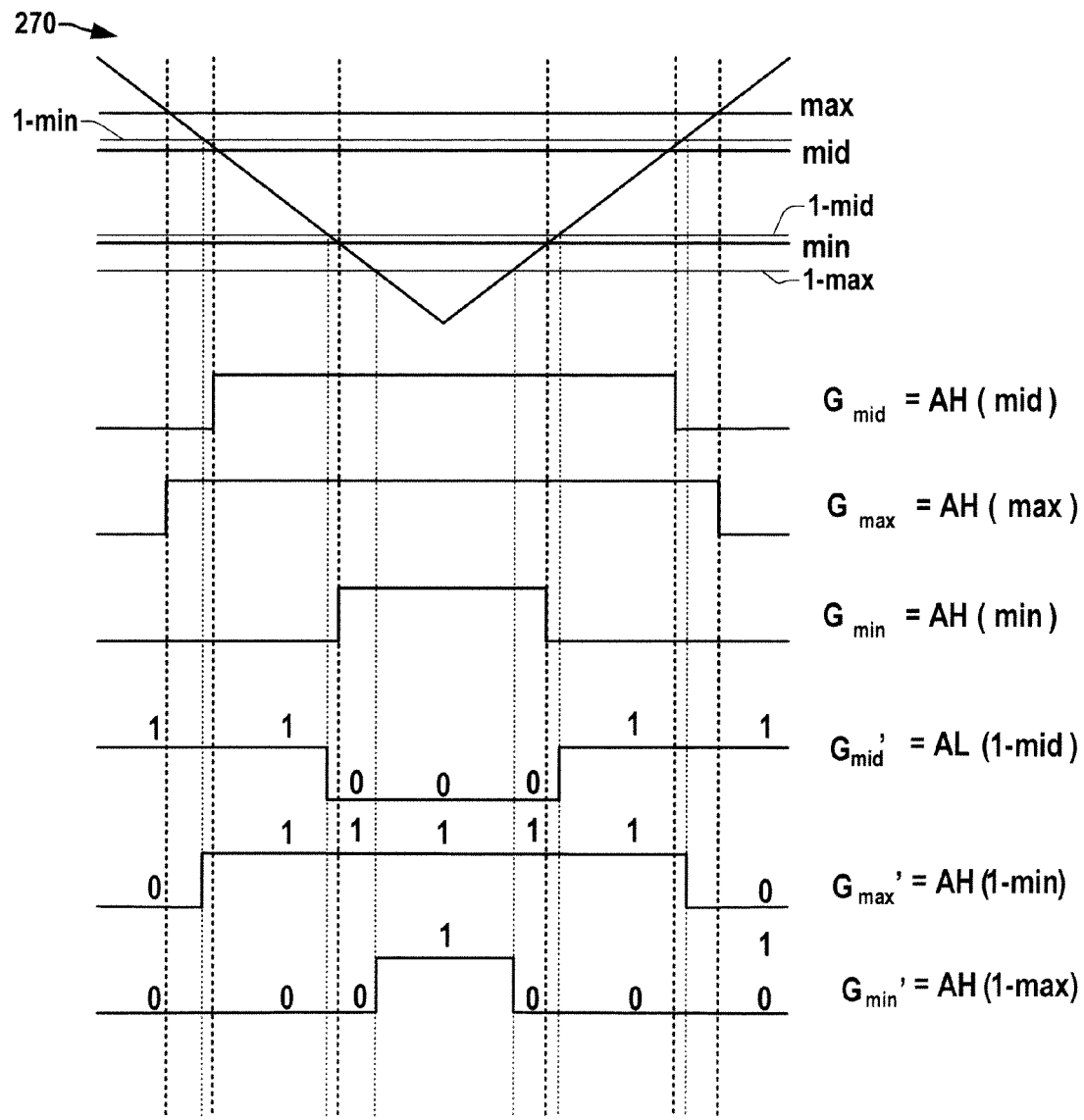

FIG. 3C illustrates a timing diagram 260 showing exemplary phase feedback signals or values labeled max, mid, and min, along with and a triangle carrier wave, where the max, mid, and min curves represent the three output phase values φ (e.g., u, v, and w) at a given point in time when the feedback signals or values are obtained by the switch control system 140. The three modulating signals are manipulated as shown in the diagram 260, in which G represents the phase switching function to generate the switching sequence 162*a* for sector 1 as described above (e.g., 101, 100, 110, 010, 110, 100, and 101). It is noted that whereas conventional PWM techniques exclusively employ active high pulse width modulation (e.g., gating signal hi state when the modulating wave is greater than the triangle wave means the upper phase switch is on and the lower phase switch is off), the illustrated CMRPWM technique employed in the controller 140 selectively employs both active high (AH) and active low (AL) modulation. In one possible implementation, the modulating waves may be modified by the CMRPWM component 168 to generate the CMRPWM switching pulse pattern in sector 1, with max being phase U and min being phase W (v is mid). In this implementation, the controller 140 uses the W phase modulating signal to gate pole U with active low PWM logic (e.g., when the modulating feedback signal/value wave is less than the triangle carrier wave, the upper switch is turned on). Also, the phase U modulating signal is used to gate pole W, also using active low logic, and there is no inversion of the logic for gating of pole V (remains active high logic). One suitable implementation is illustrated and described in the above referenced U.S. Pat. No. 7,164,254 to Kerkman et al. in which the three phase voltages u, v, and w are compared with each other to determine a max voltage in one phase, a min voltage in another phase and a mid voltage in the remaining phase., with the phase voltages and active high/low modulation being inverted for the max and min phases. By this technique, the resulting gating signals G' are obtained as shown in FIG. 3C by which the exemplary sector 1 sequence 162*a* is achieved. This technique can be employed in hardware, logic, software, firmware, or combinations thereof, for carrier-based (e.g., sine-triangle) implementation as shown in FIG. 1E above. The timing diagram of FIG. 3C when applied to sectors 1, 3, 5 of FIG. 3A produce the switching sequences as shown in FIG. 3B. If the timing diagram of FIG. 3C is applied to sector 2, the resulting switching sequence is {011, 010, 110, 100, 110, 010, 011}. The start vector of this sequence (011) differs from the end vector of sector 1 (101) in two phases u and v. Hence, this will result in spikes in the common-mode voltage during transition from sector 1 to sector 2 or vice-versa. FIG. 3D illustrates a timing diagram 270 showing exemplary phase feedback signals or values labeled max, mid, and min, along with a triangle carrier wave, where the max, mid, and min curves represent the three output phase values φ (e.g., u, v, and w) at a given point in time when the feedback signals or values are obtained by the switch control system 140. The three modulating signals are manipulated as shown in the diagram 270, in which G represents the phase switching function to generate the switching sequence 162*b* for sector 2 (e.g., 100, 110, 010, 011, 010, 110, and 100). In one possible implementation, the modulating waves may be modified by the CMRPWM component 168 to generate the CMRPWM switching pulse pattern in sector 2, with max being phase V and min being phase W (U is mid) in the illustrated example. In this implementation, the controller 140 uses the modified W phase modulating signal 1-w to gate pole V with active high PWM logic. Also, the modified phase V modulating signal 1-v is used to gate pole W, also using active high logic. The modified U phase modulating signal 1-u is used to gate phase U with active high PWM logic. By applying the timing diagram of FIG. 3D to sectors 2, 4 and 6, switching sequences 162*b*, 162*d* and 162*f*, respectively, shown in FIG. 3B can be generated, which have only one phase changing state during sector transitions.

Returning to FIGS. 2A and 2B, the process 200 begins for a new PWM period at 202 in FIG. 2A with the switch control system 140 controlling the inverter 110*b* through generation of the pulse width modulated signals 142*b*. In one example, the PWM period may be 500 μsec for pulse width modulation at a 2 kHz frequency. At 204 in FIG. 2A, a reference vector location is determined (e.g., reference vector 171 in FIG. 3A) based on feedback signals or values and received setpoint information. For instance, the desired motor position and torque may be represented in terms of the magnitude and angle of the vector 171. The controller 140 generates signals or values at 206 which represent the AC phase outputs φ (e.g., u, v, and w) based on the reference vector.

In accordance with certain aspects of the present disclosure, the exemplary process 200 optionally includes deadtime compensation at sector boundaries and/or at other switch state transitions (e.g., at 208 and/or 220 in the process 200 of FIGS. 2A and 2B). In this regard, the inverter 110*b* includes upper and lower switches for each of the three output phases u, v, and w. During a transition in a given phase φ, for instance, from 1 to 0, if the top switch is on, and the controller 140 needs to commutate and turn the bottom switch on, both switches are turned off for a brief period of time, referred to herein as the deadtime (the time between turning the top switch off and turning the bottom switch on (or vice versa)) so as to avoid short-circuiting the DC circuit 150. This is a function of the physical limitations of IGBTs or other switching devices, because the switches don't turn off instantaneously. Referring also to FIG. 1C, the inventors have appreciated that when both switches are off (to achieve the deadtime), the output voltage of that particular phase is not controlled. Depending upon the current flowing in that particular phase, one of the anti-parallel diodes (across the IGBT switch) would clamp either up or down. As a result, the desired volt-second balance of the control scheme will not be assured, because during the downtime interval, the phase voltage can either be clamped up or down, and thus the phase voltage is essentially uncontrolled during the deadtime. The resulting control error is particularly significant at very low speeds when the output voltages are also low, because the desired phase voltages are far away from Vdc. For example, a 460 volt motor at 60 Hz nominal may be running at 5 Hz and at a very low voltage, and the error caused by the deadtime (when the anti-parallel diode clamps the phase voltage to either 0 volts or Vdc) can be large, leading to distortion in the output voltage. The inventors have further appreciated that because the CMRPWM switching sequences eliminate the zero vectors, conventional deadtime compensation techniques are unsuitable.

Figure 4A:
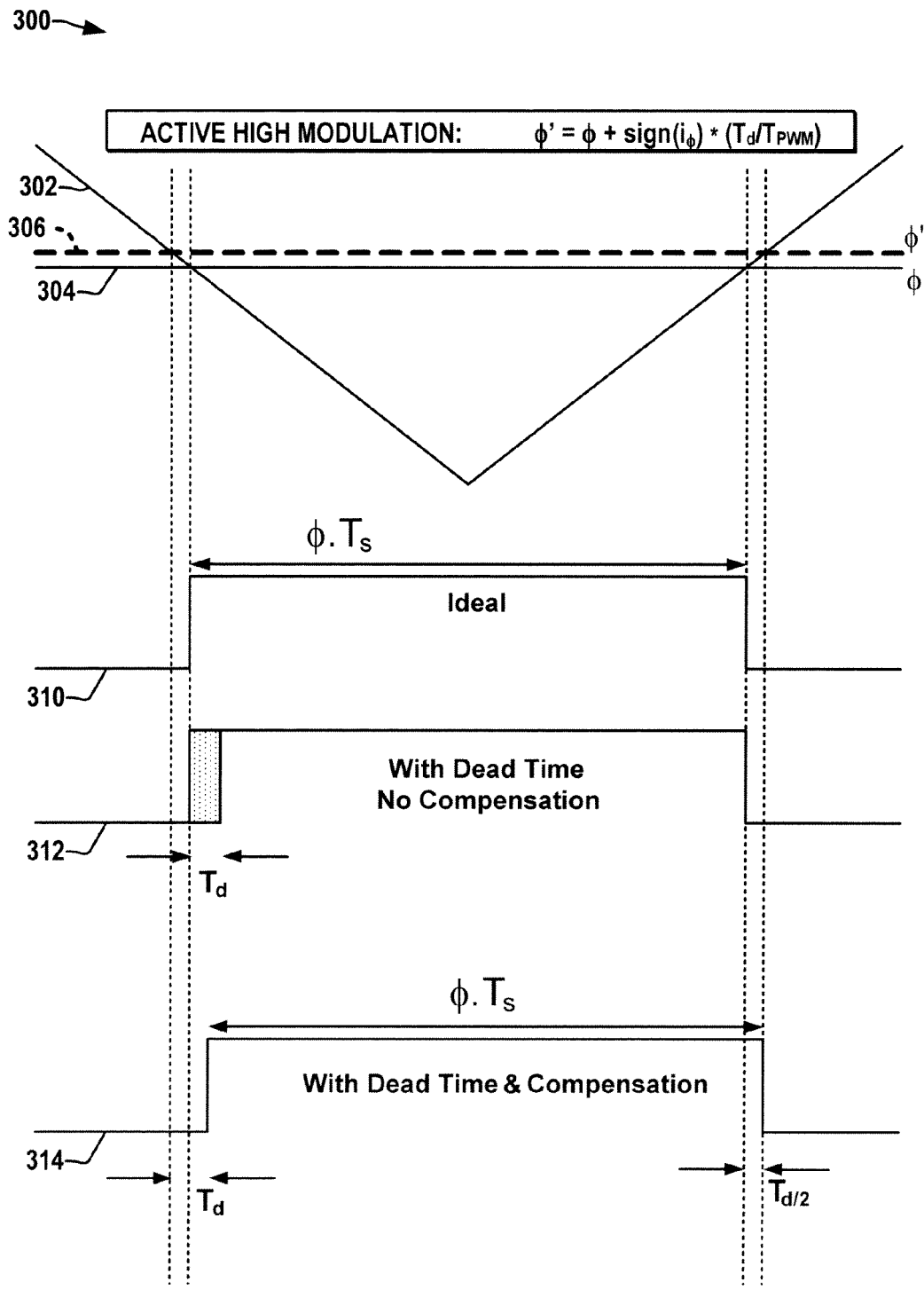
FIGS. 4A and 4B are timing diagrams illustrating selective deadtime compensation through additive or subtractive adjustment of one or more feedback signals or values based on active high or active low modulation in accordance with various aspects of the present disclosure.
Figure 4B:
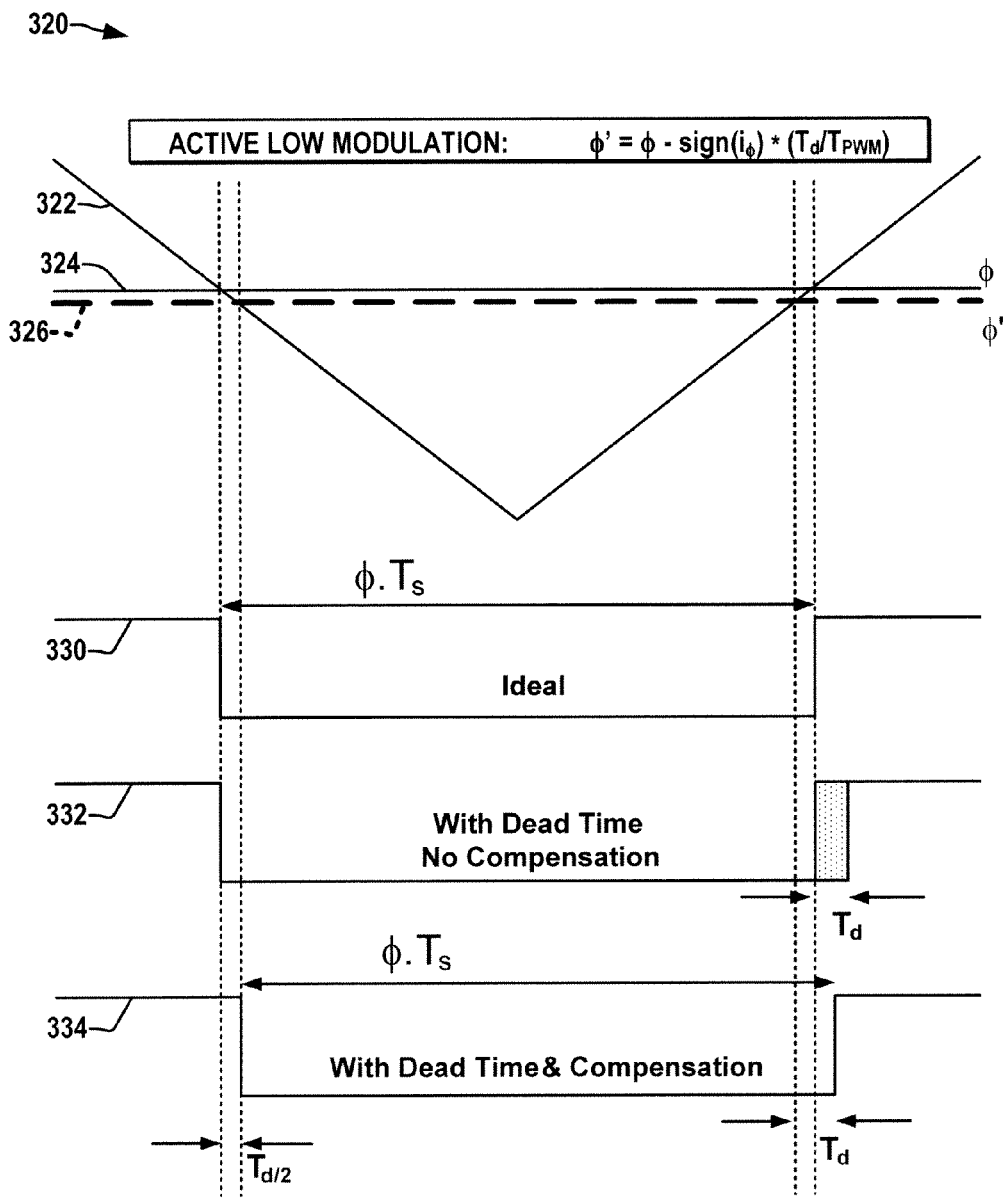

Referring also to FIGS. 4A and 4B, in order to provide deadtime compensation in conjunction with the use of the CRMPWM sequences 162, the switch control system selectively provides some of the switching control signals 142*b* using active high pulse width modulation and other switching control signals 142*b* using active low pulse width modulation, and optionally employs the deadtime compensation component 160 to selectively adjust one or more of the feedback signals or values φ higher or lower for deadtime compensation at switching state transitions and/or at sector transitions based on use of active high or active low pulse width modulation and the polarity of the phase current for the corresponding output phase. In the illustrated embodiment, the deadtime compensation component 160 is operative to selectively adjust the feedback signals or values φ according to the following equation (1) for active high pulse width modulation:

$$\phi' = \phi + \text{sign}(i_\phi) \cdot (T_d/T_{PWM}), \tag{1}$$

and selectively adjusts the feedback signals or values φ according to the following equation (2) for active low pulse width modulation:

$$\phi' = \phi - \text{sign}(i_\phi) \cdot (t_d/T_{PWM}), \tag{2}$$

where $i_\phi$ is a corresponding phase current, $T_d$ is a predetermined deadtime value (e.g., 2 μ sec in one example), and $T_{PWM}$ is a pulse width modulation period (e.g., 500 μ sec).

As shown in the diagram 300 of FIG. 4A, the deadtime compensation component 160 operates to selectively raise the feedback signal or value φ' above the uncompensated signal or value φ for active high PWM modulation. As a result, the curve 306 representing the adjusted signal/value φ' crosses the carrier 302 at a higher value than does the uncompensated curve 304, and thus the active high modulation causes the creation of the switching pulse in curve 314 in FIG. 4A with the dead time and compensation time delayed relative to the ideal case curve 310, but having the same pulse width φ.Ts. This represents an improvement over the uncompensated case shown in curve 312 in FIG. 4A, which has a different (shorter) pulse width, thereby causing output voltage distortion. For active low modulation, the diagram 320 in FIG. 4B shows the carrier waveform 322, the uncompensated phase signal or value 324 (φ) and the compensated phase signal or value 326 (φ"). As seen in the active low modulation case, without compensation, the deadtime included in the resulting pulse curve 332 results in a pulse width which is longer than that of the ideal curve 330. However, through change in the polarity of the compensation equation (2) above for the active low modulation case, the curve 334 showing the resulting switching pulse for the case with the deadtime and the compensation, the pulse width is maintained the same as the ideal case, while the entire pulse is shifted in time. In this manner, the adjusted feedback signals or values φ' are generated by the deadtime compensation component 160 prior to their use in the pulse width modulation by the CMRPWM component 162. By this technique, the optional sector boundary deadtime compensation is selectively performed at 208 in FIG. 2A if a sector transition is occurring.

At 210, the process 200 continues with selection of the appropriate CMRPWM switching sequence (e.g., one of the sequences 162*a*-162*f* in FIG. 3B is selected) at 208 based on the current reference vector location in the diagram 250 of FIG. 3A. At 212, the selected active high or active low PWM mode is set for each phase u, v, and w (e.g., based on the current switching sequence 162). The process 200 continues in FIG. 2A with optional deadtime compensation at 220 at the switching vector transitions within the current PWM period $T_{PWM}$, using the above described equations (1) and (2) according to the active high or low polarity of the pulse width modulation mode.

Figure 5A:
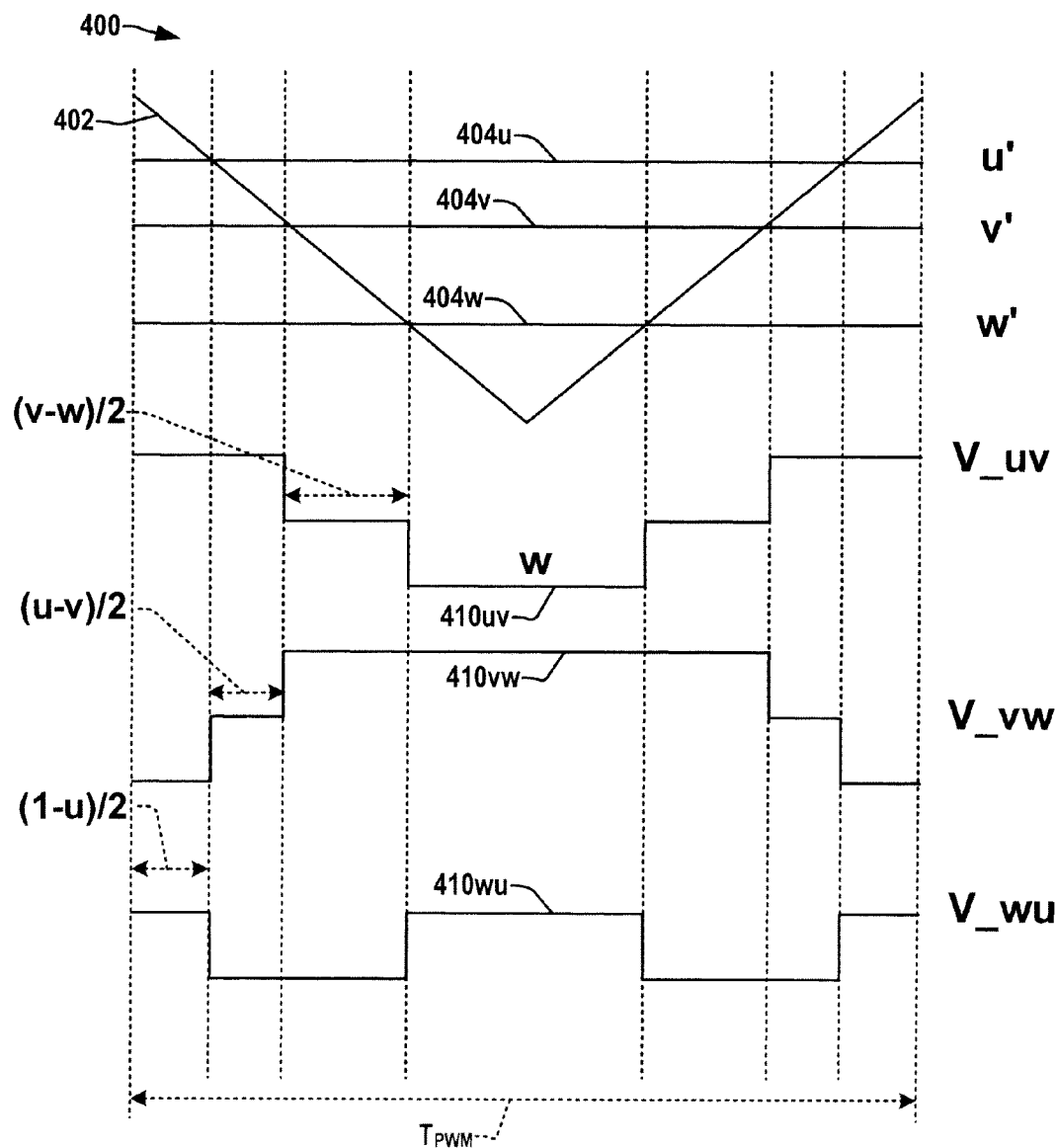
FIGS. 5A and 5B are timing diagrams illustrating selective reflected wave reduction through adjustment of one or more feedback signals or values in accordance with other aspects of the present disclosure.
Figure 5B:
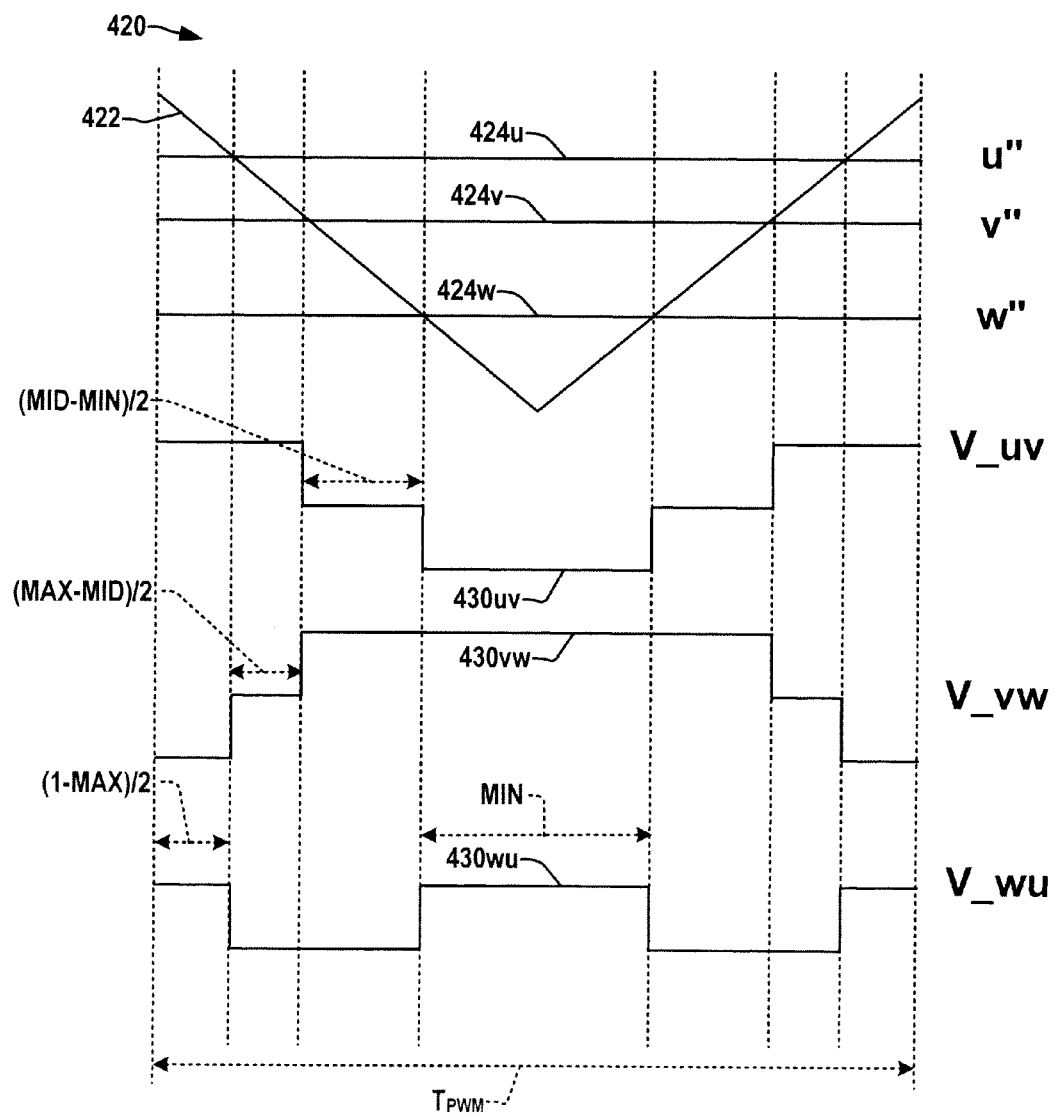

Referring now to FIGS. 2B, 5A, and 5B, in accordance with further aspects of the present disclosure, the process 200 optionally includes selective reflected wave reduction at 230-234 implemented in the reflected wave reduction component 164 of the exemplary switch control system 140. The reflected wave reduction component 164 operates at each pulse width modulation period $T_{PWM}$ to determine max, mid, and min ones of the feedback signals or values φ (or of the deadtime compensated signals or values φ') at 230 in FIG. 2B. Based on this determination, the component 164 selectively adjusts one or more feedback signals or values φ (φ') higher or lower at 232 for deadtime compensation at sector transitions to provide minimum differences between the adjusted feedback signals or values φ" according to the following equations (3) and (4):

$$(\text{max}-\text{mid}) \geq 2(T_{dwell}/T_{PWM}), \text{ and} \quad (3)$$

$$(\text{mid}-\text{min}) \geq 2(T_{dwell}/T_{PWM}), \quad (4)$$

where $T_{dwell}$ is a predetermined dwell time.

FIG. 5A shows a timing diagram 400 depicting the triangle carrier wave 402 and three modulating (sine) waves 404u, 404v, and 404w for the three output phases of the inverter 110b, as well as corresponding line-line output voltage curves 410uv, 410vw, and 410wu. The diagram 400 also illustrates the corresponding widths on the curves 410 at which the line-line voltage is zero due to the proximity of the corresponding feedback values or signals (e.g., (v-w)/2, (u-v)/2, and (1-u)/2, respectively). As the modulating waveform v gets closer to w, for instance, then (v-w) gets closer to zero, where the resulting pulse width modulation can lead to an undesirable direct transition from positive to negative or vice versa. In normal operation, absent reflected wave compensation, all the phase voltages will cross one another periodically, and will be close to one another just before and just after they cross. Absent reflected wave compensation, moreover, whenever this occurs, a direct transition in the line-line voltage output from positive to negative with happen, resulting in creation of a reflected wave in the cable between the drive 110 and the motor 120, with the motor 120 experiencing potentially high voltages and possible insulation damage.

Using the adjustment by the reflected wave reduction component 164, FIG. 5B shows a timing diagram 420 illustrating adjusted feedback signals or values u", v", and w" to puts a lower limit on the widths in the resulting line-line voltage curves 430uv, 430vw, and 430wu. In this implementation, the minimum widths in the voltage curves 430 (mid-min), (max-mid), and (1-max) are held to be greater than or equal to $2(T_{dwell}/T_{PWM})$ at all times through selective adjustment of one or more of the phase signals or values φ. This prevents direct transition from positive to negative in the switching patterns for each phase, and advantageously mitigates reflected waves in conjunction with the CMRPWM switching sequences 162 used in the controller 140 to avoid generating the high voltage switching pulses that would otherwise cause potentially damaging reflected waves.

At 234 in FIG. 2B, in accordance with further aspects of the disclosure, the reflected wave reduction component 164 accumulates reflected wave adjustment amounts for each phase signal or value φ, and adjusts one or more feedback signals or values φ higher or lower at 232 in a subsequent pulse width modulation period $T_{PWM}$ to compensate for the reflected wave reduction adjustments in a previous pulse width modulation period $T_{PWM}$. Otherwise, when the modulating signal (u', v', or w') is modified to maintain the minimum difference to avoid the reflected wave generation, this distorts the resulting motor phase output voltage, since the switching pattern is changed from what it otherwise would be. To avoid distortion, the accumulation at 234 and subsequent compensating adjustment at 232 accounts for accumulated error (e.g., a difference in switch on-time), and compensates by that amount in the next PWM period by again adjusting the modulating signals the other way.

In accordance with further aspects of the present disclosure, a computer readable medium is provided, such as a computer memory, a memory within a power converter control system (e.g., switch control system 140 in FIGS. 1A and 1B above), a CD-ROM, floppy disk, flash drive, database, server, computer, etc.) which has computer executable instructions for performing the process steps of FIGS. 2A and 2B. The above disclosure thus provides techniques and apparatus for mitigating the adverse impact of common mode voltage generated by PWM AC drives on driven AC motors or other loads, thus preventing damage to motor bearings, insulation, etc., while addressing deadtime compensation and reflected wave reduction issues using select CMRPWM switching sequences. The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:
1. A power conversion system, comprising:
a DC circuit comprising first and second DC current paths;
an inverter comprising a multi-phase AC connection having three or more AC terminals for supplying multi-phase AC electrical power, and a switching network comprising a plurality of switching devices individually coupled between one of the DC current paths and one of the AC terminals, the switching devices individually operable to selectively electrically couple the corresponding DC current path with the corresponding AC terminal according to a corresponding switching control signal; and a switch control system operative to provide the switching control signals by pulse width modulation at least partially according to feedback signals or values representing AC phase outputs and according to the position of a reference vector in a space vector modulation diagram having 6 stationary active space vectors around the periphery of the diagram and two stationary zero vectors at an origin of the diagram, the vectors representing unique switching states for the switching network and defining six triangular sectors positioned around the origin, the sectors each being defined by a unique set of two active vectors and the zero vectors at the corners of the corresponding triangular segment, the switch control system providing the switching control signals according to a selected switching sequence corresponding to the diagram sector in which the reference vector is currently located with each switching sequence using only active vectors with a first vector of each switching sequence differing by one phase switching state from a last vector of a switching sequence of an adjacent sector, the switch control system operative to selectively provide some of the switching control signals using active high pulse width modulation and other switching control signals using active low pulse width modulation, the switch control system comprising:

a deadtime compensation component operative to selectively adjust one or more feedback signals or values higher or lower for deadtime compensation at switching state transitions within a pulse width modulation period based on use of active high or active low pulse width modulation, respectively, for the corresponding output phase.

2. The power conversion system of claim 1, wherein the deadtime compensation component is operative to selectively adjust the one or more feedback signals or values $\phi$ according to the following equation $\phi'=\phi+\text{sign}(i_\phi)\cdot(T_d/T_{PWM})$ for active high pulse width modulation and according to the following equation $\phi'=\phi-\text{sign}(i_\phi)\cdot(T_d/T_{PWM})$ for active low pulse width modulation, where $i_\phi$ is a corresponding phase current, $T_d$ is a predetermined deadtime value, and $T_{PWM}$ is a pulse width modulation period.

3. The power conversion system of claim 1, wherein the deadtime compensation component is operative to selectively adjust one or more feedback signals or values $\phi$ higher or lower for deadtime compensation at sector transitions.

4. The power conversion system of claim 1, wherein the switch control system comprises a carrier-based pulse width modulation system including a carrier wave generator, at least one comparator operative to compare a carrier wave from the generator with the one or more feedback signals or values $\phi$, and a set of switching sequences to provide the switching control signals by pulse width modulation based on an output of the at least one comparator.

5. The power conversion system of claim 1, wherein the switch control system comprises a reflected wave reduction component operative at each pulse width modulation period $T_{PWM}$ to determine max, mid, and min ones of the feedback signals or values $\phi$, and to selectively adjust one or more feedback signals or values $\phi$ higher or lower at switching vector transitions to provide minimum differences between the feedback signals or values $\phi$ according to the equations $(\text{max}-\text{mid}) \geq 2(T_{dwell}/T_{PWM})$ and $(\text{min}-\text{min}) \leq 2(T_{dwell}/T_{PWM})$, where $T_{dwell}$ is a predetermined dwell time.

6. The power conversion system of claim 5, wherein the reflected wave reduction component is operative to accumulate reflected wave adjustment amounts for each phase signal or value $\phi$ and to adjust one or more feedback signals or values $\phi$ higher or lower in a subsequent pulse width modulation period $T_{PWM}$ to compensate for the reflected wave reduction adjustments in a previous pulse width modulation period $T_{PWM}$.

7. The power conversion system of claim 1, further comprising a passive rectifier with an AC input receiving AC electrical input power and providing DC electrical power to the DC circuit.

8. A power conversion system, comprising:

a DC circuit comprising first and second DC current paths;

an inverter comprising a multi-phase AC connection having three or more AC terminals for supplying multi-phase AC electrical power, and a switching network comprising a plurality of switching devices individually coupled between one of the DC current paths and one of the AC terminals, the switching devices individually operable to selectively electrically couple the corresponding DC current path with the corresponding AC terminal according to a corresponding switching control signal; and a switch control system operative to provide the switching control signals by pulse width modulation at least partially according to feedback signals or values $\phi$ representing AC phase outputs and according to the position of a reference vector in a space vector modulation diagram having 6 stationary active space vectors around the periphery of the diagram and two stationary zero vectors at an origin of the diagram, the vectors representing unique switching states for the switching network and defining six triangular sectors positioned around the origin, the sectors each being defined by a unique set of two active vectors and the zero vectors at the corners of the corresponding triangular segment, the switch control system providing the switching control signals according to a selected switching sequence corresponding to the diagram sector in which the reference vector is currently located with each switching sequence using only active vectors with a first vector of each switching sequence differing by one phase switching state from a last vector of a switching sequence of an adjacent sector, the switch control system comprising a carrier-based pulse width modulation system including:

a carrier wave generator, at least one comparator operative to compare a carrier wave from the generator with the one or more feedback signals or values $\phi$, and a set of switching sequences to provide the switching control signals by pulse width modulation based on an output of the at least one comparator.

9. The power conversion system of claim 8, wherein the switch control system comprises a reflected wave reduction component operative at each pulse width modulation period $T_{PWM}$ to determine max, mid, and min ones of the feedback signals or values $\phi$, and to selectively adjust one or more feedback signals or values $\phi$ higher or lower at switching vector transitions to provide minimum differences between the feedback signals or values $\phi$ according to the equations $(\text{max}-\text{mid}) \geq 2(T_{dwell}/T_{PWM})$ and $(\text{mid}-\text{min}) \geq 2(T_{dwell}/T_{PWM})$, where $T_{dwell}$ is a predetermined dwell time.

10. The power conversion system of claim 9, wherein the reflected wave reduction component is operative to accumulate reflected wave adjustment amounts for each phase signal or value $\phi$ and to adjust one or more feedback signals or values $\phi$ higher or lower in a subsequent pulse width modulation period $T_{PWM}$ to compensate for the reflected wave reduction adjustments in a previous pulse width modulation period $T_{PWM}$.

11. The power conversion system of claim 1, further comprising a passive rectifier with an AC input receiving AC electrical input power and providing DC electrical power to the DC circuit.

12. The power conversion system of claim 8, wherein the switch control system comprises a deadtime compensation component operative to selectively adjust one or more feedback signals or values $\phi$ higher or lower for deadtime compensation at switching state transitions within a pulse width modulation period $T_{PWM}$ based on use of active high or active low pulse width modulation, respectively, for the corresponding output phase.

13. The power conversion system of claim 8, wherein the deadtime compensation component is operative to selectively adjust one or more feedback signals or values $\phi$ higher or lower for deadtime compensation at sector transitions.

14. A power conversion system, comprising:
a DC circuit comprising first and second DC current paths;
an inverter comprising a multi-phase AC connection having three or more AC terminals for supplying multi-phase AC electrical power, and a switching network comprising a plurality of switching devices individually coupled between one of the DC current paths and one of the AC terminals, the switching devices individually operable to selectively electrically couple the corresponding DC current path with the corresponding AC terminal according to a corresponding switching control signal; and
a switch control system operative to provide the switching control signals by carrier-based pulse width modulation at least partially according to feedback signals or values $\phi$ representing AC phase outputs and according to the position of a reference vector in a space vector modulation diagram having 6 stationary active space vectors around the periphery of the diagram and two stationary zero vectors at an origin of the diagram, the vectors representing unique switching states for the switching network and defining six triangular sectors positioned around the origin, the sectors each being defined by a unique set of two active vectors and the zero vectors at the corners of the corresponding triangular segment, the switch control system providing the switching control signals according to a selected switching sequence corresponding to the diagram sector in which the reference vector is currently located with each switching sequence using only active vectors with a first vector of each switching sequence differing by one phase switching state from a last vector of a switching sequence of an adjacent sector, the switch control system comprising a reflected wave reduction component operative at each pulse width modulation period $T_{PWM}$ to determine max, mid, and min ones of the feedback signals or values $\phi$, and to selectively adjust one or more feedback signals or values $\phi$ higher or lower to provide minimum differences between the feedback signals or values $\phi$ according to the equations (max−mid)$\geq 2(T_{dwell}/T_{PWM})$ and (mid−min)$\geq 2(T_{dwell}/T_{PWM})$, where $T_{dwell}$ is a predetermined dwell time.

15. The power conversion system of claim 14, wherein the reflected wave reduction component is operative to accumulate reflected wave adjustment amounts for each phase signal or value $\phi$ and to adjust one or more feedback signals or values $\phi$ higher or lower in a subsequent pulse width modulation period $T_{PWM}$ to compensate for the reflected wave reduction adjustments in a previous pulse width modulation period $T_{PWM}$.

16. The power conversion system of claim 15, wherein the switch control system comprises a deadtime compensation component operative to selectively adjust the one or more feedback signals or values $\phi$ according to the following equation $\phi'=\phi+\text{sign}(i_\phi)\cdot(T_d/T_{PWM})$ for active high pulse width modulation and according to the following equation $\phi'=\phi-\text{sign}(i_\phi)\cdot(T_d/T_{PWM})$ for active low pulse width modulation, where $i_\phi$ is a corresponding phase current, $T_d$ is a predetermined deadtime value, and $T_{PWM}$ is a pulse width modulation period.

17. The power conversion system of claim 15, wherein the switch control system comprises a deadtime compensation component operative to selectively adjust one or more feedback signals or values $\phi$ higher or lower for deadtime compensation at sector transitions.

18. The power conversion system of claim 14, wherein the switch control system comprises a carrier-based pulse width modulation system including a carrier wave generator, at least one comparator operative to compare a carrier wave from the generator with the one or more feedback signals or values $\phi$, and a set of switching sequences to provide the switching control signals by pulse width modulation based on an output of the at least one comparator.

19. The power conversion system of claim 14, further comprising a passive rectifier with an AC input receiving AC electrical input power and providing DC electrical power to the DC circuit.

20. The power conversion system of claim 14, wherein the switch control system comprises a deadtime compensation component operative to selectively adjust the one or more feedback signals or values $\phi$ according to the following equation $\phi'=\phi+\text{sign}(i_\phi)\cdot(T_d/T_{PWM})$ for active high pulse width modulation and according to the following equation $\phi'=\phi-\text{sign}(i_\phi)\cdot(T_d/T_{PWM})$ for active low pulse width modulation, where $i_\phi$ is a corresponding phase current, $T_d$ is a predetermined deadtime value, and $T_{PWM}$ is a pulse width modulation period, and to selectively adjust one or more feedback signals or values $\phi$ higher or lower for deadtime compensation at sector transitions.

* * * * *